(12) United States Patent
Skoog

(10) Patent No.: US 6,556,694 B2
(45) Date of Patent: *Apr. 29, 2003

(54) DIGITIZER STYLUS CONTAINING HANDWRITING DATA

(75) Inventor: Steven K. Skoog, Colorado Springs, CO (US)

(73) Assignee: Hyundai Electronics America, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/726,879

(22) Filed: Nov. 30, 2000

(65) Prior Publication Data

US 2001/0000026 A1 Mar. 15, 2001

Related U.S. Application Data

(63) Continuation of application No. 08/905,922, filed on Aug. 5, 1997, now Pat. No. 6,195,446, which is a continuation of application No. 08/357,810, filed on Dec. 16, 1994, now abandoned.

(51) Int. Cl.[7] ................................................. G06K 9/00
(52) U.S. Cl. ...................................................... 382/119
(58) Field of Search ................................ 382/118, 119, 382/120, 121, 122, 123, 188, 313, 314, 315

(56) References Cited

U.S. PATENT DOCUMENTS

| 4,650,926 A | 3/1987 | Nakamura et al. ........ 178/18.02 |
| 4,672,154 A | 6/1987 | Rodgers et al. .......... 178/19.07 |
| 4,814,552 A | 3/1989 | Stefik et al. .............. 178/19.02 |
| 4,831,566 A | 5/1989 | Matthews et al. ............. 702/95 |
| 4,853,493 A | 8/1989 | Schlosser et al. ........ 178/18.05 |
| 5,004,872 A | 4/1991 | Lasley ...................... 178/19.04 |
| 5,054,088 A | 10/1991 | Gunderson et al. ......... 382/120 |
| 5,115,107 A | 5/1992 | Crooks et al. .............. 345/178 |
| 5,136,125 A | 8/1992 | Russell ..................... 178/18.07 |
| 5,138,118 A | 8/1992 | Russell ..................... 178/19.03 |
| 5,150,420 A | 9/1992 | Haraguchi ................... 382/119 |
| 5,218,174 A | 6/1993 | Gray et al. ............... 178/20.02 |
| 5,223,677 A | 6/1993 | Kapp et al. ............... 178/18.03 |

(List continued on next page.)

FOREIGN PATENT DOCUMENTS

| EP | 0 362 970 A2 | 4/1990 | ............ G06K/9/22 |
| EP | 615209 | 9/1994 | ............ G06K/9/24 |
| EP | 622724 | 11/1994 | ............ G06F/3/033 |
| JP | 6272651 | 3/1987 | ............ G06K/17/00 |
| WO | WO 87/06744 A1 | 11/1987 | ............ G06K/9/78 |
| WO | 9200815 | 5/1992 | ............ G06F/1/00 |
| WO | 9418663 | 8/1994 | ............ G09G/3/02 |

Primary Examiner—Andrew W. Johns
Assistant Examiner—Shervin Nakhjavan
(74) Attorney, Agent, or Firm—Townsend and Townsend and Crew LLP

(57) ABSTRACT

The invention concerns a stylus for use with a digitizing tablet. The stylus stores information which identifies characteristics of a user's handwriting. These characteristics are transmitted to a computer when the user interfaces with the computer, and are used by the computer to recognize the user's handwriting.

10 Claims, 10 Drawing Sheets

U.S. PATENT DOCUMENTS

| | | | |
|---|---|---|---|
| 5,225,636 A | 7/1993 | Protheroe | 178/18.05 |
| 5,227,590 A | 7/1993 | Protheroe et al. | 178/18.03 |
| 5,227,622 A | 7/1993 | Suzuki | 250/221 |
| 5,239,489 A | 8/1993 | Russell | 701/37 |
| 5,241,303 A | 8/1993 | Register et al. | 345/168 |
| 5,245,139 A | 9/1993 | Protheroe et al. | 178/18.05 |
| 5,247,137 A | 9/1993 | Epperson | 178/19.04 |
| 5,247,138 A | 9/1993 | Landmeier | 178/19.01 |
| 5,285,506 A | 2/1994 | Crooks et al. | 382/189 |
| 5,287,417 A | 2/1994 | Eller et al. | 382/276 |
| 5,294,792 A | 3/1994 | Lewis et al. | 250/221 |
| 5,321,584 A | 6/1994 | Matheny | 361/752 |
| 5,349,139 A | 9/1994 | Verrier et al. | 178/19.04 |
| 5,373,118 A | 12/1994 | Watson | 178/19.07 |
| 5,414,227 A | 5/1995 | Schumbert et al. | 345/179 |
| 5,434,371 A | 7/1995 | Brooks | 178/19.04 |
| 5,454,046 A | 9/1995 | Carman, II | 382/186 |
| 5,478,976 A | 12/1995 | Kano | 178/18.01 |
| 5,501,535 A | 3/1996 | Wieczorek et al. | 400/88 |
| 5,517,579 A | 5/1996 | Baron et al. | 382/187 |
| 5,525,981 A | 6/1996 | Abernethy | 341/34 |
| 5,533,141 A | 7/1996 | Futatsugi et al. | 382/119 |
| 5,557,076 A | 9/1996 | Wieczorek et al. | 178/18.03 |
| 5,574,851 A | 11/1996 | Rathunde | 714/7 |
| 5,581,783 A | 12/1996 | Ohashi | 710/5 |
| 5,608,390 A | 3/1997 | Gasparik | 340/870.1 |
| 5,612,720 A | 3/1997 | Ito et al. | 345/179 |
| 6,195,446 B1 * | 2/2001 | Skoog | 382/119 |

* cited by examiner

DIGITIZER STYLUS CONTAINING HANDWRITING DATA

CROSS REFERENCE TO RELATED APPLICATION

This application is a continuation of U.S. application Ser. No. 08/905,922 filed on Aug. 5, 1997 now U.S. Pat. No. 6,195,446 which is a continuation of U.S. application Ser. No. 08/357,810 filed on Dec. 16, 1994, now abandoned. The present invention is related to commonly assigned and co-pending U.S. application with Ser. No. 08/906,254 filed on Aug. 4, 1997 now U.S. Pat. No. 5,883,338 by Skoog et al., which is a continuation of U.S. application Ser. No. 08/358,213 filed concurrently with this application on Dec. 16, 1994 by Skoog et al., now abandoned which is hereby incorporated by reference.

The invention concerns a stylus for use with a digitizing tablet. The stylus stores information regarding the characteristics of a user's handwriting, in digital format.

When the user seeks to interface with a computer, the stylus downloads the characteristics to the computer. The computer then uses the characteristics to recognize, or interpret, the user's handwriting.

BACKGROUND OF THE INVENTION

Simplified Explanation of Digitizing Tablet

FIG. 1 illustrates a computer 4 and a digitizing tablet 3, which provides input to the computer. (The digitizing tablet need not be a separate element, as shown in FIG. 1, but can take the form of a transparent overlay of the display 2. This overlay configuration is frequently used in pen-based portable computers.)

The tablet-and-stylus combination provide input to the computer. A simplified explanation of the operation of the tablet will be given.

FIG. 2 shows a digitizing tablet 3 and its associated stylus 6. In the tablet, there are four current-to-voltage amplifiers (labeled I-to-V), one at each corner. The stylus 6, when activated, produces a signal 9, as indicated in FIG. 3. This signal induces currents I1, I2, I3, and I4, which are detected by the I-to-V amplifiers.

The I-to-V amplifiers each produce a voltage (V) indicative of the size of its respective current (I). Processing circuitry, not shown, but known in the art, receives the voltage signals, and computes the position of the stylus 6.

The currents I1–I4 are induced because the stylus 6 acts as one plate of a capacitor. The digitizing tablet supplies the other plate: it bears a resistive surface, or grid, of a material such as indium tin oxide, which acts as the other plate.

As FIG. 4 indicates, when negative charge is applied to the tip 5 of the stylus 6, a positive charge is induced on the surface of the tablet 3. Currents I1–I4 supply this positive charge. Conversely, as in FIG. 5, a positive charge on the tip 5 of the stylus 6 induces a negative charge on the tablet. The currents I1–I4 supply this negative charge.

As FIG. 6 shows, each current can be viewed as following a direct path from the stylus to one corner of the tablet. The following reasoning allows stylus position to be inferred from the voltage signals:

1. The length of each path determines the resistance of the path.

2. The resistance determines the size of the current.

3. The size of the current determines the voltage produced by the amplifier.

4. Each voltage indicates its respective path length. A highly simplified example will illustrate the above-described inference.

Assume that the stylus in FIG. 6 represents a voltage source applied to the tablet. The paths have the relative lengths shown in FIG. 6, and also listed in the following Table.

TABLE

| PATH | RELATIVE LENGTH | RELATIVE RESISTANCE | RELATIVE CURRENT | RELATIVE I-to-V VOLTAGE |
|---|---|---|---|---|
| AA | 0.66 | 0.66 | 1.52 | 1.52 |
| BB | 1.00 | 1.00 | 1.00 | 1.00 |
| CC | 0.93 | 0.93 | 1.08 | 1.08 |
| DD | 0.55 | 0.55 | 1.82 | 1.82 |

The resistance of the path depends on the length, so that the relative resistances are in proportion to the relative path lengths, as indicated in the Table's columns RELATIVE LENGTH and RELATIVE RESISTANCE.

Current equals voltage divided by resistance, V/R, so that the relative currents will be inversely proportional to the relative path lengths, as indicated in the Table's column RELATIVE CURRENT.

The I-to-V amplifiers in FIG. 2 each produce a voltage which is proportional to its respective current. Thus, the voltage outputs of the I-to-V amplifiers have the relative magnitudes indicated in the rightmost column of the Table.

The output voltage signals can be used to compute position of the stylus.

Signature Recognition

The system described above can be used to recognize a user's signature. FIG. 7 shows the stylus 6 writing a signature. The position of the stylus 6 is detected periodically, such as every 1/100 second, or other suitable interval. Data points, indicated by the crosses in FIG. 8, are derived at these intervals.

For each data point, the x- and y-position are known, together with the real-time occurrence of the data point. Consequently, velocities, accelerations, and other parameters, in addition to the x- and y-positions, can be derived.

Each person's signature is represented by a unique collection of these parameters. Thus, these parameters, like fingerprints, can be used to identify a person.

Tether Not Required

Some styluses are not tethered to the computer by the power cord P shown in FIG. 1; instead, they are battery-powered.

OBJECTS OF THE INVENTION

An object of the invention is to provide improved signature recognition apparatus.

A further object of the invention is to provide a stylus, for use with a digitizing tablet, which contains data which describes its owner's signature.

SUMMARY OF THE INVENTION

In one form of the invention, a stylus contains memory which stores data which describes the signature of the owner of the stylus.

In another form of the invention, the description of the signature, contained in the stylus, is compared with a signature actually written by the user. If they match, the identity of the user is confirmed.

DETAILED DESCRIPTION OF THE INVENTION

Overview

One form of the invention can conceptually be divided into two parts. One, a user writes a signature on a digitizing tablet, using a special stylus, and the tablet digitizes or otherwise parameterizes the signature. This signature may be called a sample signature.

Two, the special stylus contains a prerecorded, digitized image of the user's signature, which may be called a reference signature. The stylus transmits the reference signature to the digitizing tablet, which compares the sample signature with the reference signature. If they match, the user is assumed to be the actual owner of the stylus.

Detailed Description

Storage of Digitized Signature Data into Stylus

EXAMPLE 1

Figure 9:
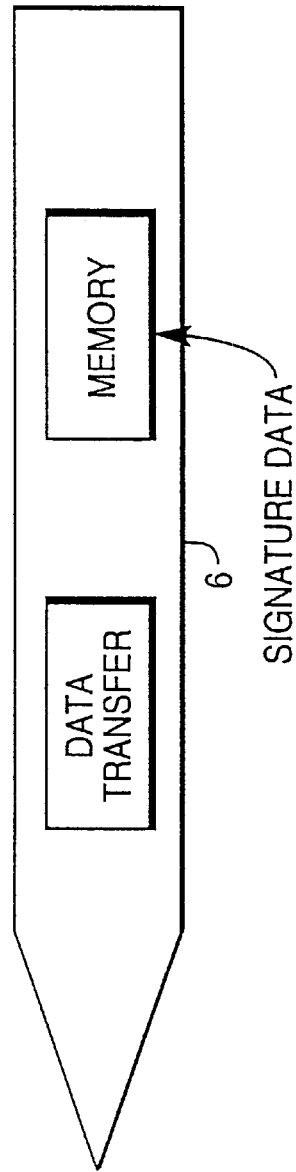
FIG. 9 illustrates a stylus 6 which contains MEMORY which holds data indicative of a reference signature.

The reference signature data can be loaded into the MEMORY of the stylus 6 in FIG. 9 in numerous different ways. Perhaps the easiest to explain is the following procedure:

(1) The user writes the reference signature onto a digitizing tablet, which digitizes the data, in the usual manner. The digitizing produces a table of reference data, which describes the reference signature.

(2) The table is burned into a PROM, EPROM, EEPROM, or other memory chip.

(3) The chip is installed into the stylus, producing the product shown in FIG. 9.

EXAMPLE 2

Figure 13:
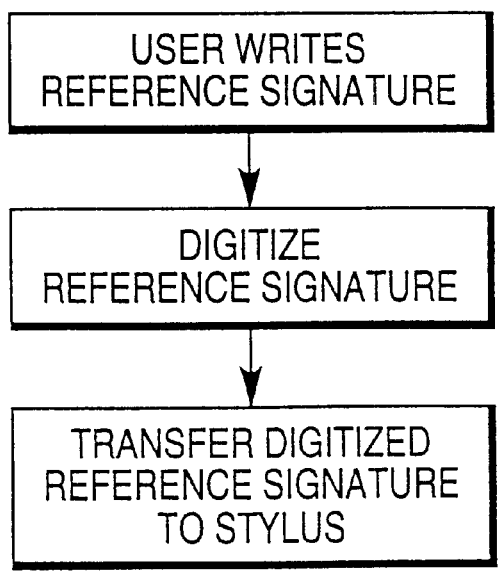
FIG. 13 is a flow chart illustrating loading of reference signature data into a stylus.

Another approach eliminates the need to install a memory chip into the stylus, and is illustrated by the flow chart of FIG. 13. A user writes a signature onto a digitizing tablet, as in FIG. 7, and reference signature data is derived from the written signature, in a known manner.

This reference data is then loaded into the MEMORY within the stylus (illustrated in FIG. 9), using wireless telemetry described below.

Types of Digitized Parameters

Figure 8:
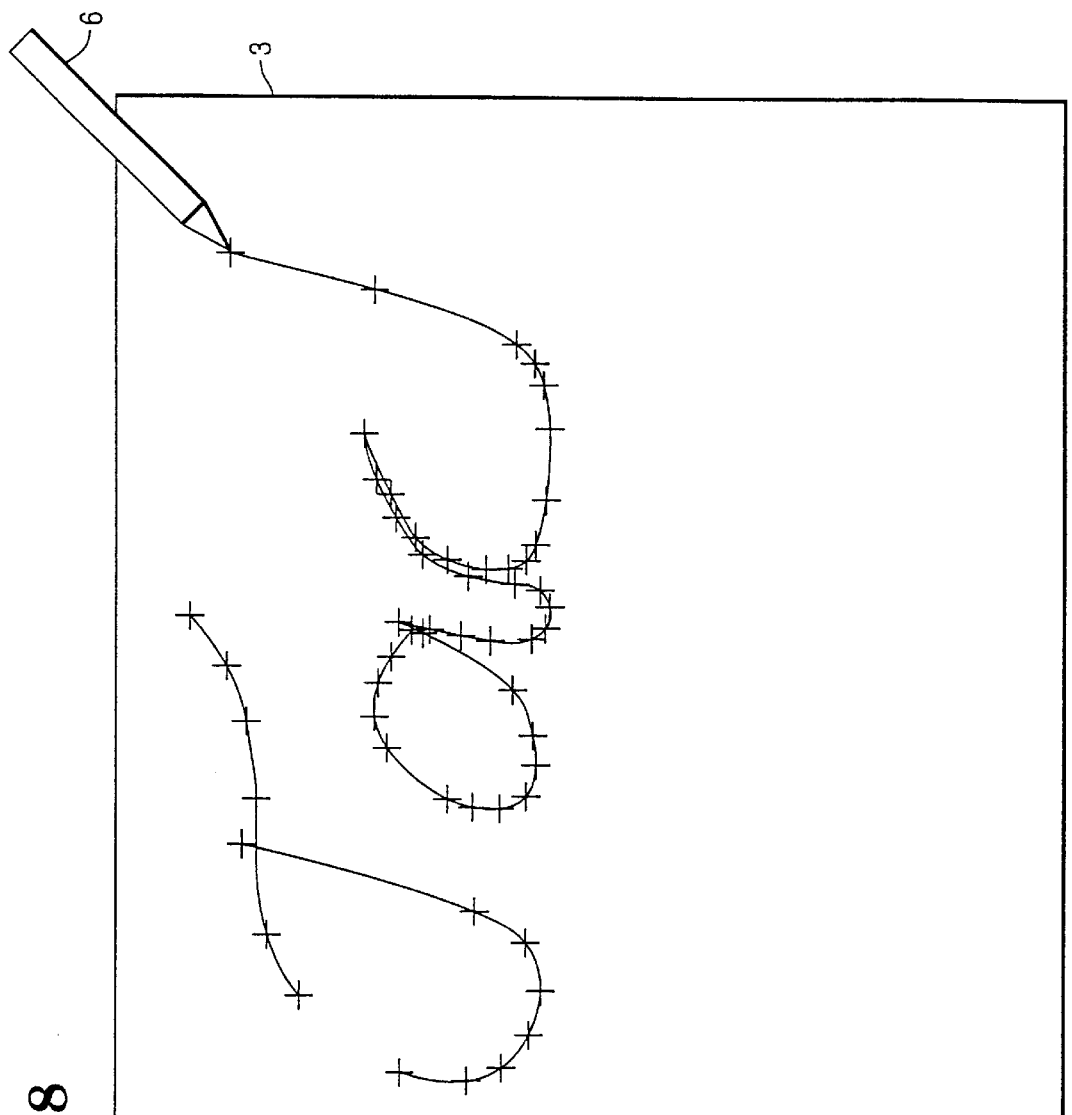
FIG. 8 illustrates digitizing a signature.

There are several formats for digitizing signature data. Perhaps the simplest is a bit-map of the signature: the collection of points in FIG. 8 comprises a bit-map of the signature.

Two other formats are illustrated in the following U.S. patents, which are hereby incorporated by reference:

U.S. Pat. No. 5,285,506, Crooks et al., issued Feb. 8, 1994, Ser. No. 693,822, filed Apr. 30, 1991; and U.S. Pat. No. 5,054,088, Gunderson et al., issued Oct. 1, 1991, Ser. No. 409,906, filed Sep. 20, 1989.

The particular format used in digitizing the signature is not necessarily significant.

Manner of Data Transfer

It is preferred that the data transfer between the stylus and the digitizing tablet be accomplished by wireless telemetry.

Examples of data transfer between a stylus and a digitizing tablet are given in the following US patents, which are hereby incorporated by reference:

U.S. Pat. No. 4,672,154, Rodgers, et al., issued Jun. 9, 1987, Ser. No. 719,351, filed Apr. 3, 1985;

U.S. Pat. No. 5,247,138, Landmeier, issued Sep. 21, 1993, Ser. No. 789,665, filed Nov. 8, 1991;

U.S. Pat. No. 5,294,792, Lewis, et al., issued Mar. 15, 1994, Ser. No. 816,330, filed Dec. 31, 1991; and U.S. Pat. 5,247,137, Epperson, issued Sep. 21, 1993, Ser. No. 782,615, filed Oct. 25, 1991.

In addition, U.S. Pat. No. 5,608,390 issued on Mar. 4, 1997 to Frank Gasparik, and entitled "Synchronous Telemetry Channel" is hereby incorporated by reference.

The telemetry can be radio-frequency, optical, acoustical, or other types. Numerous approaches, known in the art, exist for transfer of data between a computer and a remote component.

Figure 10:
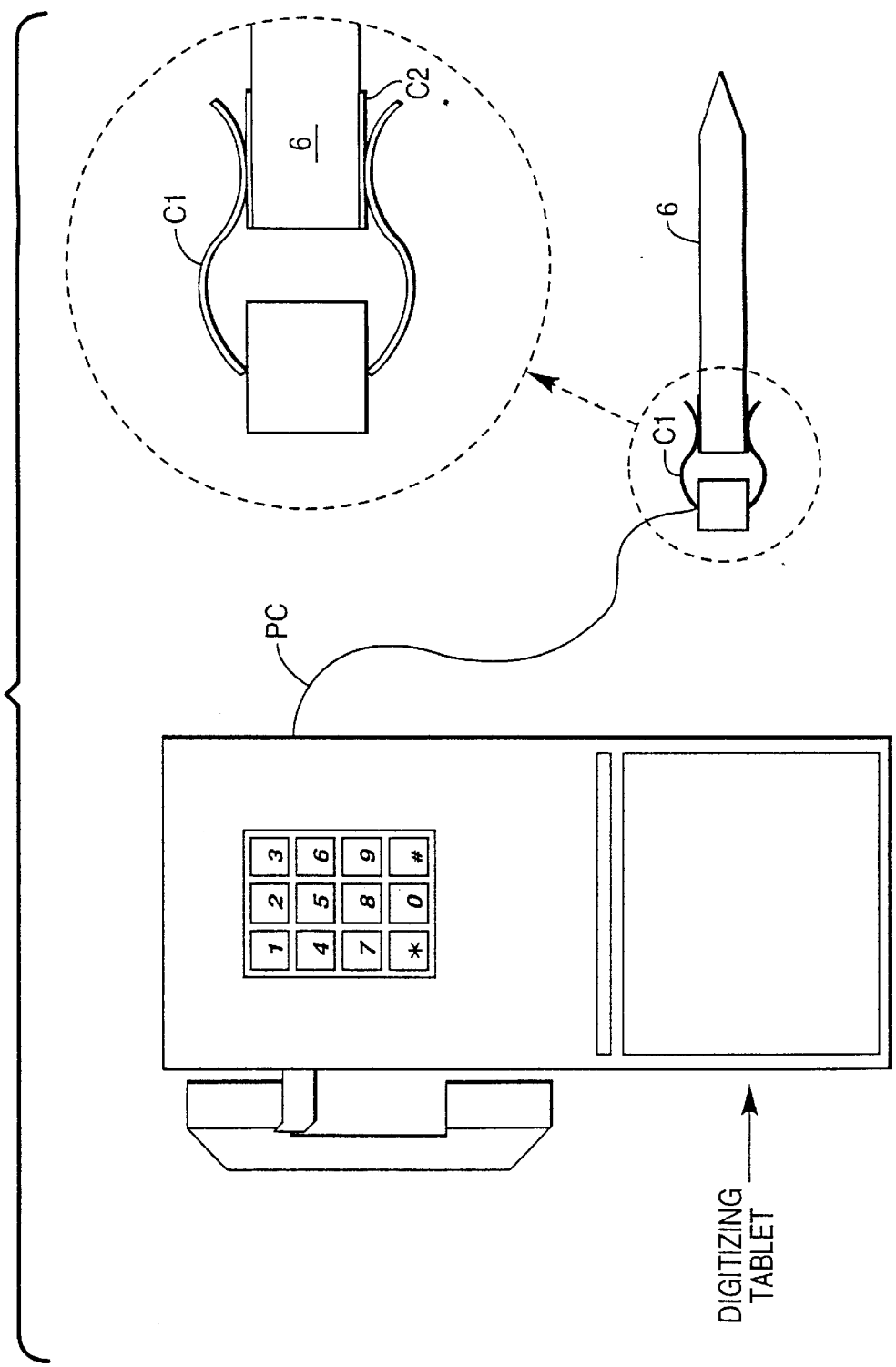
FIG. 10 illustrates a public data terminal, such as an advanced public telephone, having an associated DIGITIZING PAD, and also a power cable PC containing contacts C1 which connect with contacts C2 carried by a stylus 6.

As an alternate to wireless telemetry, a removable, hard-wired connection can be made between the stylus and a digitizing device. For example, the stylus can contain metallic contacts which mate with a receiver, as shown in FIG. 10. The hard-wired approach can be useful in situations where it is desired to deliver electrical power to the stylus, as for charging a battery, or for allowing the stylus to consume larger amounts of power than are feasible to provide via battery.

Important Considerations

1. The signature need not be the actual, legal signature of the user. The signature can be any graphical image which the user draws. It can be a word, or a picture, and can be described generically as an "image."

2. The time of transfer of the reference data, relative to the time of writing the signature, is not necessarily significant. For example, the transfer of reference data can be done prior to the writing of the sample signature, or afterward.

Also, the reference data can be transferred during writing of the signature. That is, a multiplexing between position data and signature transfer data can be undertaken.

Figure 1:
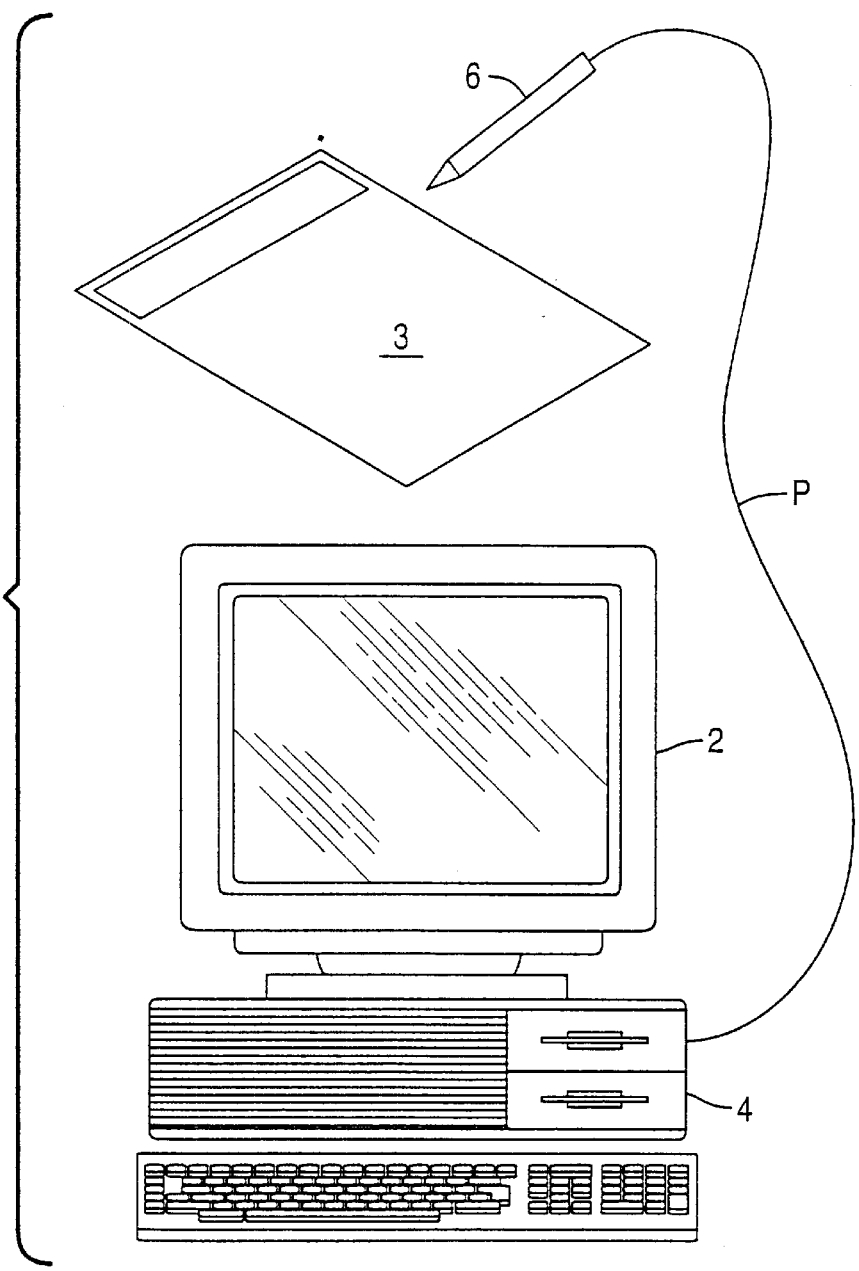
FIG. 1 illustrates a digitizing tablet 3 associated with a computer 4.
Figure 2:
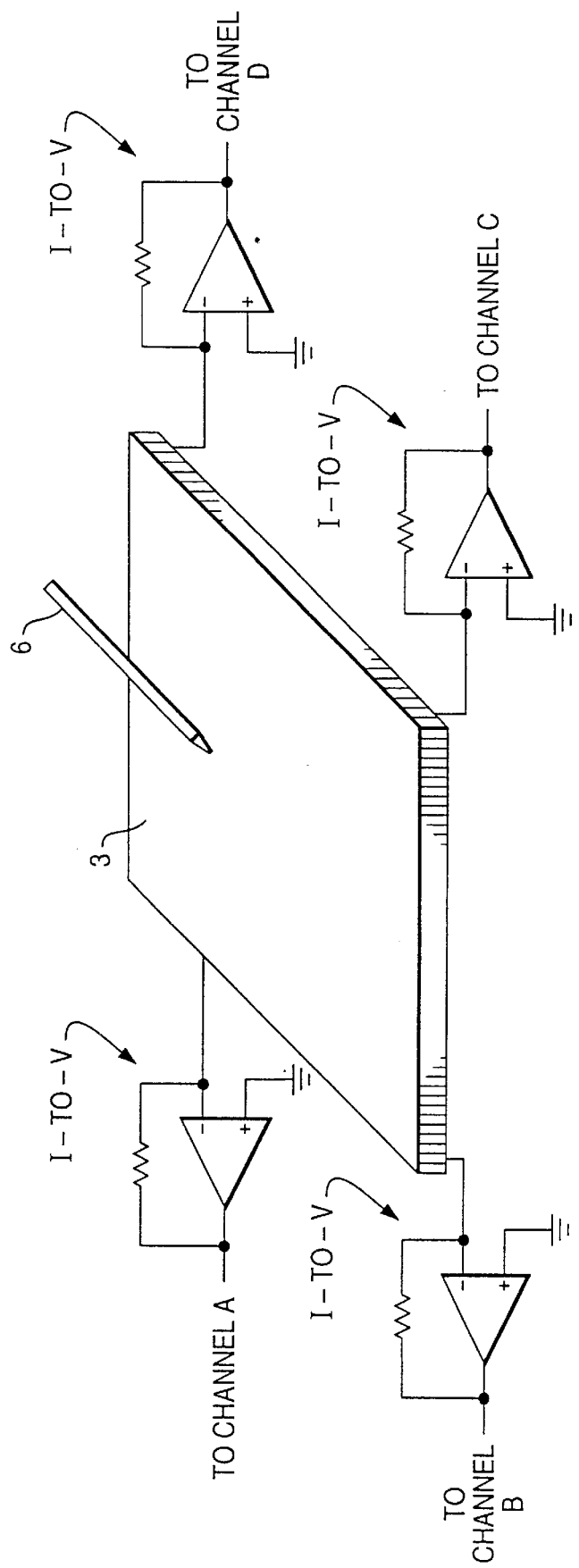
FIG. 2 is a simplified view of a digitizing tablet.
Figure 3:
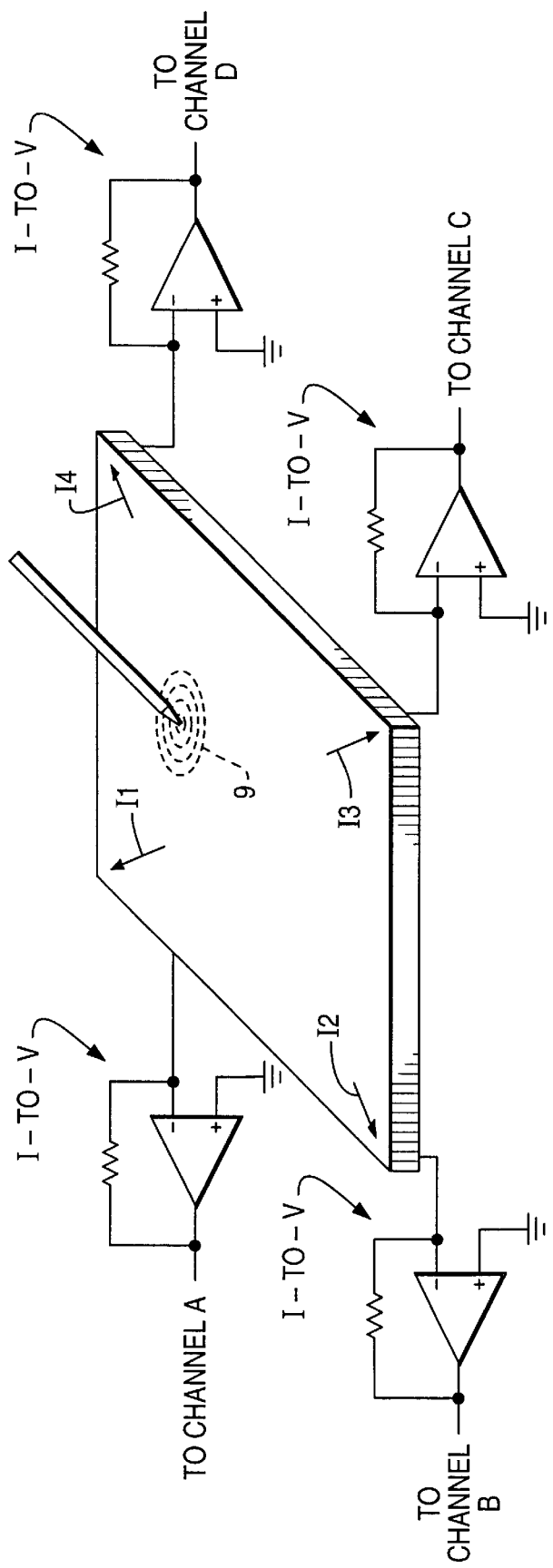
FIG. 3 illustrates a signal 9 produced by a stylus, and currents I1, I2, I3, and I4 induced by the signal.
Figure 4:
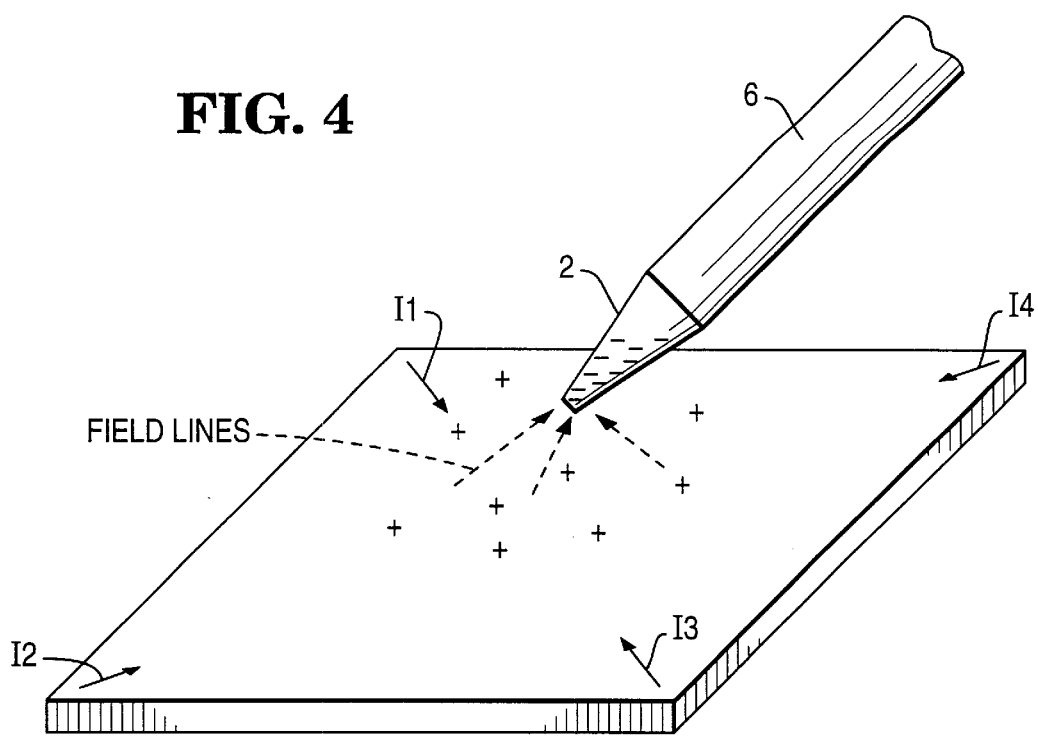
FIGS. 4 and 5 illustrate in more detail how the currents are produced.
Figure 5:
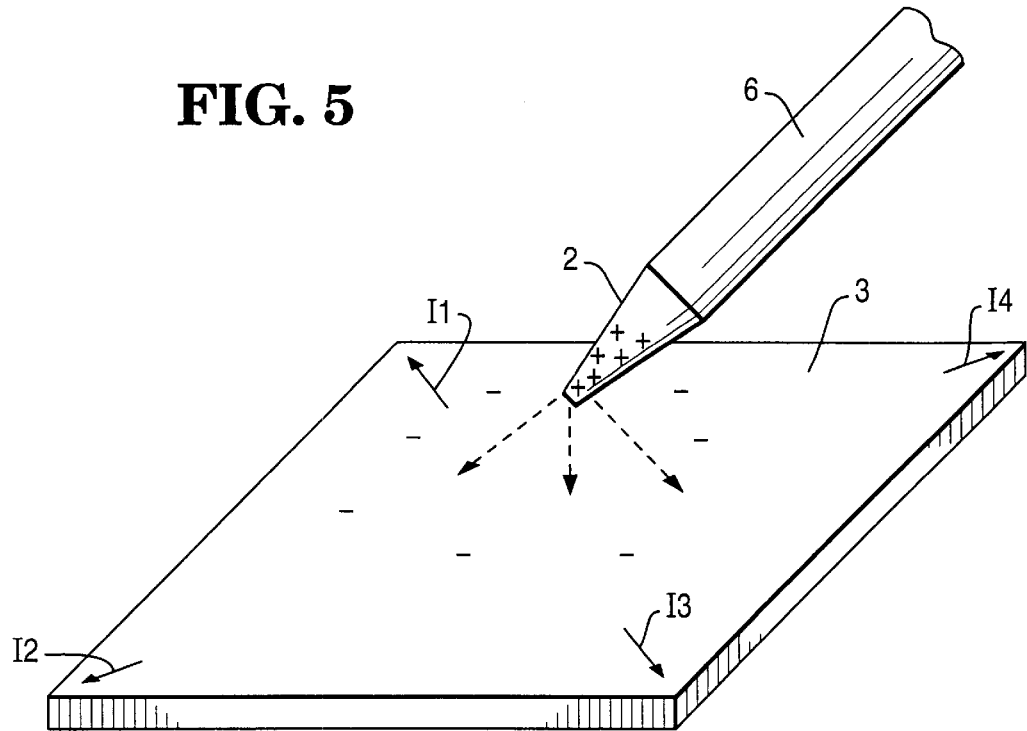
Figure 6:
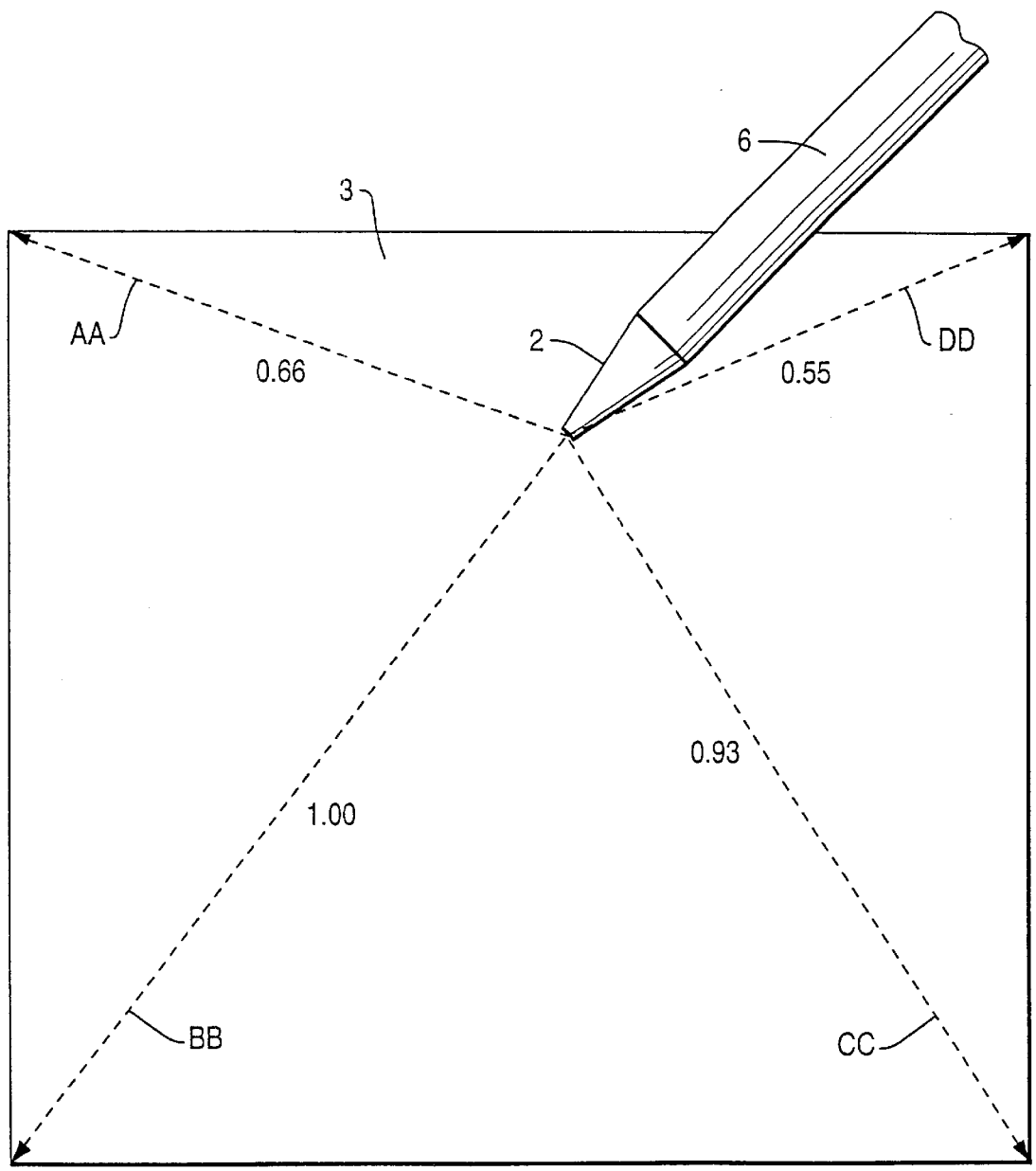
FIG. 6 illustrates paths followed by the currents.

Further, the transfer of the reference signature data can be accomplished by a second data channel, independent of the position signal 9 shown in FIG. 3. Such a channel is described in the U.S. Patent Application of Frank Gasparik, identified above.

3. From one perspective, there are two computation tasks involved:

(1) producing sample data from the sample signature, and (2) comparing the sample data with the reference data.

How these tasks are allocated between devices is not necessarily significant. For example, the digitizing tablet may contain a processor which produces the sample data described in task (1). However, a computer may perform the comparison described in task (2).

4. It should be observed that the reference data stored within the stylus is not mere intangible information. For example, data stored in a PROM takes the form of fuses, which are either blown or intact. A blown fuse indicates a ZERO, and an intact fuse indicates a ONE (or vice-versa). Similar observations apply to EPROMS and EEPROMS.

Thus, even though the reference signature data comprises indicia of the reference signature, the reference signature data is nevertheless a tangible entity.

5. Power consumption in styluses used with digitizing tablets is an important issue: batteries used to power the styluses occupy space, and must be replaced or recharged periodically.

Figure 11:
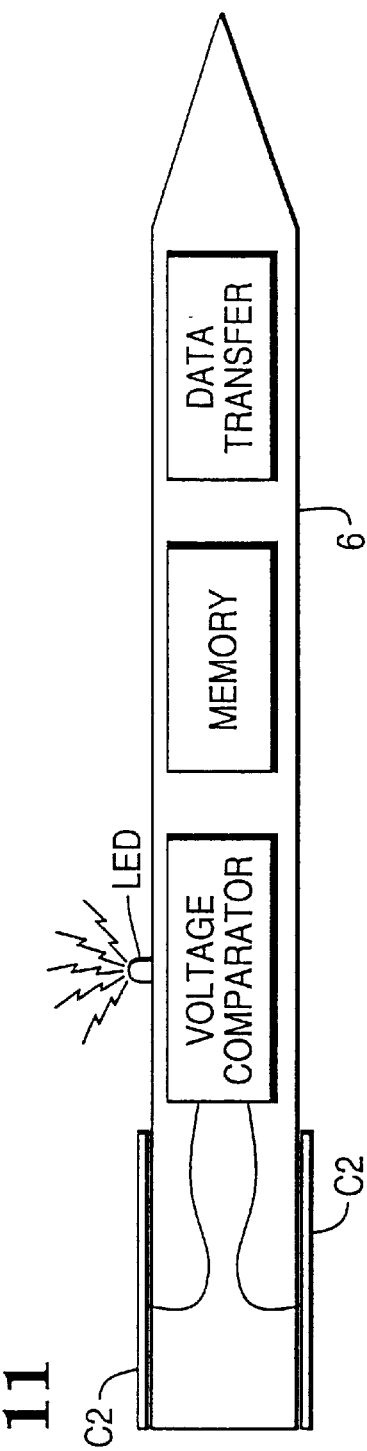
FIG. 11 illustrates a stylus lacking batteries or other power source, which receives electrical power through contacts C2.

It may be desirable to construct a stylus which contains no batteries at all, and which draws all of its power from an external, stationary source. FIGS. 10 and 11 provide an example.

In FIG. 10, a user attaches the stylus to a power cord PC, which provides power to the stylus. A VOLTAGE COMPARATOR in FIG. 11 tests whether proper voltage is being delivered, and lights an LED when proper voltage is received.

With this arrangement, the stylus can produce a higher-power signal 9 in FIG. 3, without concern over battery depletion. In addition, the power cord PC can contain a channel for downloading of the reference signature data, in order to eliminate telemetry.

6. The invention can allow local identification of a user, without the requirement of added telecommunication. An example of identification, in which telecommunication is required, will illustrate.

When a user enters a card into an Automated Teller Machine (ATM), the ATM asks the user for a password. Meanwhile, the ATM links, by telephone generally, to a central computer, and finds out the user's password. The ATM then compares the password which the user entered with the password learned from the central computer. This telecommunication takes time, adds cost, and is subject to failure under certain conditions, such as thunderstorms.

Figure 12:
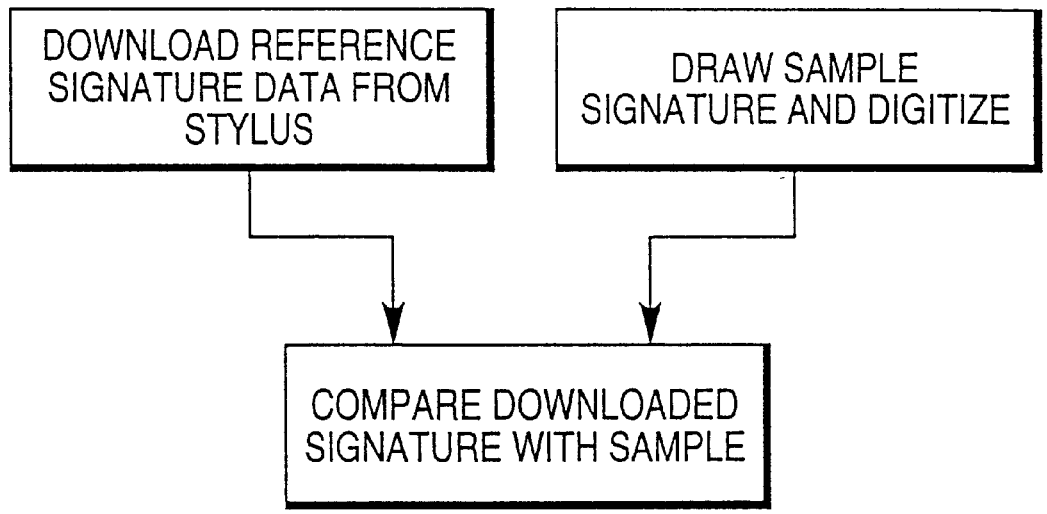
FIG. 12 is a flow chart illustrating one signature verification procedure.

The invention eliminates the requirement of contacting a central computer. FIG. 12 describes a sequence of steps of identification of a user, without resort to telecommunication.

7. The following examples illustrate situations in which identification of a user can be made by signature. The list is certainly not exhaustive.

a) Admission of a user to restricted locations.

b) Granting of access to a user to computer installations.

c) Granting access to ATMs.

8. The data stored in the stylus need not be limited to data which can be used to identify the user's signature. Rather, the data can be the type used to interpret the user's handwriting generally.

Figure 7:
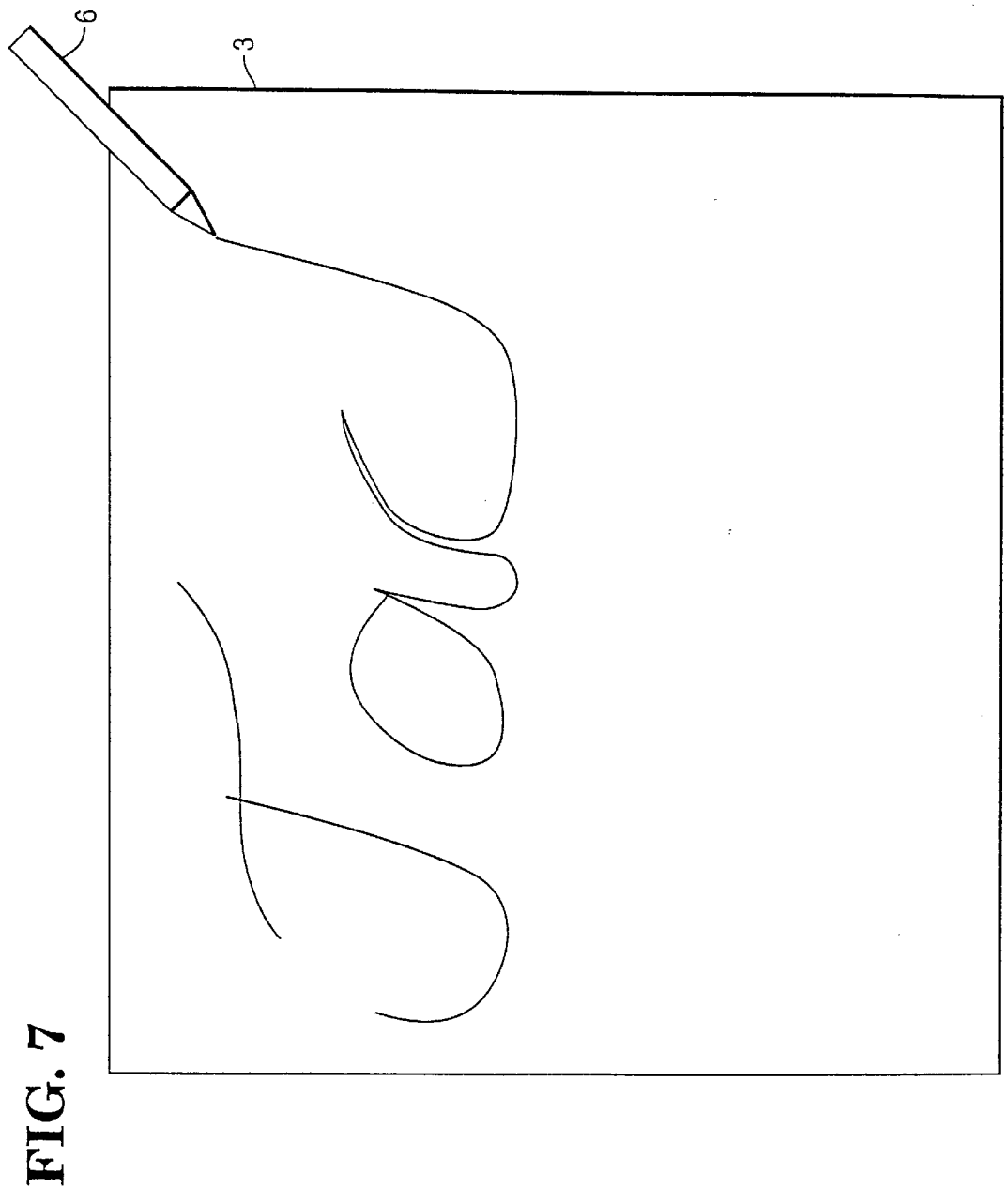
FIG. 7 illustrates a signature.

For example, the sample written by the user, as indicated in FIG. 7, may be required to contain a sufficient number of symbols to characterize the user's handwriting, for purposes of allowing a computer to later read the user's handwriting.

The system derives the necessary handwriting characteristics from the sample, according to the method of handwriting recognition used by the system. Such handwriting characterization is known in the art. The system then loads these characteristics into memory contained in the stylus, in a manner similar to loading the reference signature data.

Later, when the user interfaces with a computer, using the stylus, the stylus transmits the user's handwriting characteristics to the computer, in the manner described above. The computer uses these characteristics to interpret the user's handwriting.

As a very simple example, which illustrates some of the underlying principles, will be given. The sample which the user writes may contain every letter of the alphabet, both upper and lower case, plus the ten numerals. The system digitizes each character, as described in connection with FIG. 7. Now, the system contains a digitized sample representing each letter and number of the user's handwriting.

These digitized samples are stored within the stylus. When the user wishes to deal with a computer, the stylus downloads the digitized samples to the computer. When the user writes handwriting on the digitizing tablet, the computer compares each letter with the digitized samples, and selects the best match, thereby interpreting the handwriting.

Of course, advanced handwriting systems do not perform this comparison of digitized characters. Instead, they characterize the user's handwriting in other ways, but the basic idea is still the same: obtain unique characteristics of the user's handwriting (i.e., "learn" the user's handwriting), and then interpret the user's handwriting, based on these characteristics.

Of course, the data indicative of the user's handwriting characteristics can be loaded into the stylus in other ways, and the particular method of loading is not necessarily significant. Thus, one important aspect of the invention is the storage, no matter how achieved, within the stylus, of data which is used to recognize a user's handwriting.

Numerous substitutions and modifications can be undertaken without departing from the true spirit and scope of the invention. What is desired to be secured by Letters Patent is the Invention as defined in the following claims.

What is claimed is:

1. A user verification method comprising:

providing an electronic stylus;

providing a digitizing tablet adapted to receive handwriting information from said electronic stylus;

providing a receiver located remotely from said electronic stylus to receive verification data about the user via a telemetry signal from the electronic stylus;

providing a memory coupled to the receiver to store the verification data of the user;

providing a transmitter disposed in said electronic stylus to transmit said verification data of the user so as to verify a signature of said user;

providing a memory to store sample handwriting information input by said user utilizing the electronic stylus and the digitizing tablet so that said sample handwriting information can be used to verify the signature of the user;

formatting said verification data as data elements representative of the signature of the user;

providing a comparator to compare said sample handwriting information input by said user with said verification data of the user so as to verify that said sample handwriting information is authentic; and disposing said transmitter in said electronic stylus so as to be operable to transmit said verification data to said receiver without the use of a physical connection between said transmitter and said receiver.

2. A user verification method comprising:

providing an electronic stylus;

providing a digitizing tablet adapted to receive handwriting information from said electronic stylus;

providing a receiver located remotely from said electronic stylus to receive verification data about the user via a telemetry signal from the electronic stylus;

providing a memory coupled to the receiver to store the verification data of the user;

providing a transmitter disposed in said electronic stylus to transmit said verification data of the user so as to verify a personal-identification-number of said user;

providing a memory to store sample handwriting information input by said user utilizing the electronic stylus and the digitizing tablet so that said sample handwriting information can be used to verify the personal-identification-number of the user;

formatting said verification data as data elements representative of the personal-identification-number of the user;

providing a comparator to compare said sample handwriting information input by said user with said verification data of the user so as to verify that said sample handwriting information is authentic; and disposing said transmitter in said electronic stylus so as to be operable to transmit said verification data to said receiver without the use of a physical connection between said transmitter and said receiver.

3. A method for use in a user verification system, said user verification system comprising:

a digitizing tablet adapted to receive handwriting information from an electronic stylus;

a receiver located remotely from said electronic stylus to receive verification data about a user via a telemetry signal from the electronic stylus;

a memory coupled to the receiver to store the verification data; and a comparator operable to compare sample handwriting information input by said user with said verification data of the user so as to verify that said sample handwriting information is authentic;

said method comprising:

providing said electronic stylus;

providing a transmitter disposed in said electronic stylus, said transmitter operable to transmit said verification data of the user to said receiver so as to verify a signature of said user;

disposing said transmitter in said electronic stylus so as to be operable to transmit said verification data to said receiver without the use of a physical connection between said transmitter and said receiver; and formatting said verification data as data elements representative of the signature of the user.

4. A method for use in a user verification system, said user verification system comprising:

a digitizing tablet adapted to receive handwriting information from an electronic stylus;

a receiver located remotely from said electronic stylus to receive verification data about a user via a telemetry signal from the electronic stylus;

a memory coupled to the receiver to store the verification data; and a comparator operable to compare sample handwriting information input by said user with said verification data of the user so as to verify that said sample handwriting information is authentic;

said method comprising:

providing said electronic stylus;

providing a transmitter disposed in said electronic stylus, said transmitter operable to transmit said verification data of the user to said receiver so as to verify a signature of said user;

disposing said transmitter in said electronic stylus so as to be operable to transmit said verification data to said receiver without the use of a physical connection between said transmitter and said receiver; and formatting said verification data as data elements representative of the personal-identification-number of the user.

5. A method for use in a user verification system, said user verification system comprising:

an electronic stylus;

a transmitter disposed in said electronic stylus to transmit verification data about a user so as to verify a signature of said user;

wherein said transmitter is disposed in said electronic stylus so as to be operable to transmit said verification data to a receiver without the use of a physical connection between said transmitter and said receiver;

said method comprising:

providing a digitizing tablet adapted to receive handwriting information from said electronic stylus;

providing said receiver located remotely from said electronic stylus to receive said verification data about the user via a telemetry signal from said electronic stylus;

providing a memory coupled to said receiver to store said verification data;

providing a memory to store sample handwriting information input by said user utilizing said electronic stylus and said digitizing tablet so that said sample handwriting information can be used to verify the signature of the user;

formatting said verification data as data elements representative of the signature of the user; and providing a comparator to compare said sample handwriting information input by the user with said verification data so as to verify that said sample handwriting information is authentic.

6. A method for use in a user verification system, said user verification system comprising:

an electronic stylus;

a transmitter disposed in said electronic stylus to transmit verification data about a user so as to verify a personal-identification-number of said user;

wherein said transmitter is disposed in said electronic stylus so as to be operable to transmit said verification data to a receiver without the use of a physical connection between said transmitter and said receiver;

said method comprising:

providing a digitizing tablet adapted to receive handwriting information from said electronic stylus;

providing said receiver located remotely from said electronic stylus to receive said verification data about the user via a telemetry signal from said electronic stylus;

providing a memory coupled to said receiver to tore said verification data;

providing a memory to store sample handwriting information input by said user utilizing said electronic stylus and said digitizing tablet so that said sample handwriting information can be used to verify the personal-identification-number of the user;

formatting said verification data as data elements representative of the personal-identification-number of the user; and providing a comparator to compare said sample handwriting information input by the user with said verification data so as to verify that said sample handwriting information is authentic.

7. An apparatus for use in a user verification system, said user verification system comprising:

a digitizing tablet adapted to receive handwriting information from an electronic stylus;

a receiver located remotely from said electronic stylus to receive verification data about a user via a telemetry signal from the electronic stylus;

a memory coupled to the receiver to store the verification data, wherein said verification data is formatted as data elements representative of the signature of the user; and a comparator operable to compare sample handwriting information input by said user with said verification data of the user so as to verify that said sample handwriting information is authentic;

said apparatus comprising:
an electronic stylus;
a transmitter disposed in said electronic stylus, said transmitter operable to transmit said verification data of the user to said receiver so as to verify said sample handwriting information of said user;
wherein said transmitter is disposed in said electronic stylus so as to be operable to transmit said verification data to said receiver without the use of a physical connection between said transmitter and said receiver.

8. An apparatus for use in a user verification system, said user verification system comprising:

a digitizing tablet adapted to receive handwriting information from an electronic stylus;

a receiver located remotely from said electronic stylus to receive verification data about a user via a telemetry signal from the electronic stylus;

a memory coupled to the receiver to store the verification data, wherein said verification data is formatted as data elements representative of a personal-identification-number of the user; and a comparator operable to compare sample handwriting information input by said user with said verification data of the user so as to verify that said sample handwriting information is authentic;

said apparatus comprising:
an electronic stylus;
a transmitter disposed in said electronic stylus, said transmitter operable to transmit said verification data of the user to said receiver so as to verify said sample handwriting information of said user;
wherein said transmitter is disposed in said electronic stylus so as to be operable to transmit said verification data to said receiver without the use of a physical connection between said transmitter and said receiver.

9. An apparatus for use in a user verification system, said user verification system comprising:

an electronic stylus;

a transmitter disposed in said electronic stylus to transmit verification data about a user so as to verify a signature of said user;

wherein said transmitter is disposed in said electronic stylus so as to be operable to transmit said verification data to a receiver without the use of a physical connection between said transmitter and said receiver;

said apparatus comprising:
a digitizing tablet adapted to receive handwriting information from said electronic stylus;
a receiver located remotely from said electronic stylus to receive said verification data about the user via a telemetry signal from said electronic stylus;
a memory coupled to said receiver to store said verification data, wherein said verification data is formatted as data elements representative of the signature of the user;
a memory to store sample handwriting information input by said user utilizing said electronic stylus and said digitizing tablet so that said sample handwriting information can be used to verify the signature of the user; and
a comparator to compare said sample handwriting information input by the user with said verification data so as to verify that said sample handwriting information is authentic.

10. An apparatus for use in a user verification system, said user verification system comprising:

an electronic stylus;

a transmitter disposed in said electronic stylus to transmit verification data about a user so as to verify a personal-identification-number of said user;

wherein said transmitter is disposed in said electronic stylus so as to be operable to transmit said verification data to a receiver without the use of a physical connection between said transmitter and said receiver;

said apparats comprising:
a digitizing tablet adapted to receive handwriting information from said electronic stylus;
a receiver located remotely from said electronic stylus to receive said verification data about the user via a telemetry signal from said electronic stylus;
a memory coupled to said receiver to store said verification data, wherein said verification data is formatted as data elements representative of the personal-identification-number of the user;
a memory to store sample handwriting information input by said user utilizing said electronic stylus and said digitizing tablet so that said sample handwriting information can be used to verity the personal-identification-number of the user; and
a comparator to compare said sample handwriting information input by the user with said verification data so as to verify at said sample handwriting information is authentic.

* * * * *

UNITED STATES PATENT AND TRADEMARK OFFICE
CERTIFICATE OF CORRECTION

PATENT NO. : 6,556,694 B2  Page 1 of 1
DATED : April 29, 2003
INVENTOR(S) : Steven K. Skoog It is certified that error appears in the above-identified patent and that said Letters Patent is hereby corrected as shown below:

Column 9,
Line 1, "tore" should read -- store --.

Column 10,
Line 44, "apparats" should read -- apparatus --.
Line 57, "verity" should read -- verify --.
Line 61, "at" should read -- that --.

Signed and Sealed this

Eighth Day of July, 2003

JAMES E. ROGAN
*Director of the United States Patent and Trademark Office*